United States Patent
Ferris

(10) Patent No.: US 8,639,950 B2
(45) Date of Patent: *Jan. 28, 2014

(54) SYSTEMS AND METHODS FOR MANAGEMENT OF SECURE DATA IN CLOUD-BASED NETWORK

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/335,844

(22) Filed: Dec. 22, 2011

(65) Prior Publication Data

US 2012/0096567 A1 Apr. 19, 2012

Related U.S. Application Data

(63) Continuation of application No. 12/129,341, filed on May 29, 2008, now Pat. No. 8,108,912.

(51) Int. Cl.
*H04L 29/06* (2006.01)
*G06F 21/00* (2013.01)

(52) U.S. Cl.
USPC .................................. 713/193; 726/26; 726/3

(58) Field of Classification Search
None
See application file for complete search history.

(56) References Cited

U.S. PATENT DOCUMENTS

| | | | |
|---|---|---|---|
| 6,421,711 B1 * | 7/2002 | Blumenau et al. | 709/213 |
| 6,463,457 B1 | 10/2002 | Armentrout et al. | |
| 7,032,242 B1 * | 4/2006 | Grabelsky et al. | 726/11 |
| 7,313,796 B2 | 12/2007 | Hamilton et al. | |
| 7,373,394 B1 | 5/2008 | Li et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0014423 A1 * | 1/2003 | Chuah et al. | 707/102 |
| 2003/0037258 A1 | 2/2003 | Koren | |
| 2003/0065620 A1 * | 4/2003 | Gailey et al. | 705/51 |
| 2003/0110252 A1 | 6/2003 | Yang-Huffman | |
| 2003/0135609 A1 | 7/2003 | Carlson et al. | |
| 2004/0034550 A1 * | 2/2004 | Menschik et al. | 705/3 |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |

(Continued)

*Primary Examiner* — Gilberto Barron, Jr.
*Assistant Examiner* — Malcolm Cribbs
(74) *Attorney, Agent, or Firm* — Lowenstein Sandler LLP

(57) ABSTRACT

Embodiments relate to systems and methods for the management of secure data in a cloud-based network. A secure data store can store sensitive or confidential data, such as account numbers, social security numbers, medical or other information in an on-premise data facility. Regulatory and/or operational requirements may prohibit the migration or unprotected transmission of the secure data to the cloud. An operator can instantiate a set of virtual machines to access and process the secure data, for example to process online purchase transactions. To prevent unauthorized disclosure of the secure data, the secure data store can receive data access requests via a translation module that translates the secure data. The secure data store can retrieve and transmit the secure data using a protection mechanism such as a masking and/or encryption mechanism, avoiding the unprotected transport or exposure of that data to the cloud.

18 Claims, 5 Drawing Sheets

(56) References Cited

U.S. PATENT DOCUMENTS

| | | |
|---|---|---|
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwano et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0134316 A1* | 6/2008 | Devonshire et al. ............ 726/15 |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1 | 9/2010 | Wei |
| 2010/0299366 A1 | 11/2010 | Stienhans et al. |
| 2011/0016214 A1 | 1/2011 | Jackson |
| 2011/0131335 A1 | 6/2011 | Spaltro et al. |

* cited by examiner

SYSTEMS AND METHODS FOR MANAGEMENT OF SECURE DATA IN CLOUD-BASED NETWORK

CROSS-REFERENCE TO RELATED APPLICATION

This application is a continuation of U.S. patent application Ser. No. 12/129,341 filed May 29, 2008.

TECHNICAL FIELD

The present teachings relate to systems and methods for the management of secure data in a cloud-based network, and more particularly to platforms and techniques for managing secure data in an on-premise data store while establishing data processing resources to operate on that data in an external cloud.

BACKGROUND

Networked computer platforms warehouse a variety of sensitive data, including personal information related to customers or other uses. For example, many Web vendors retain customer name, address, and credit card information for the conveniences of their customers. Many other entities securely store sensitive, private or critical information, further including data such as medical information, credit information, tax information, and many other varieties of personal or confidential information. The organization maintaining the data store may in cases be responsible for the integrity of the stored information due to regulatory requirements, such as the Sarbanes-Oxley Act of 2002, the Health Insurance Privacy and Portability Act of 1996 Act (HIPPA), or other compliance frameworks.

An organization that manages secure data in an on-premise or other network may choose to migrate that network to a cloud-based environment. In a cloud-based environment, the user can select and establish a set of virtual machines on a comparatively short-term basis to support Web storefronts and other applications. The resources required to support the user's set of virtual machines can be assembled from a set of resource servers which can supply various components for the user's specified infrastructure, on a per-component basis. One set of resources servers can supply processor cycles, while another set of resource servers serve operating system or application servers to the set of virtual machines from the cloud. In cloud implementations, the set of instantiated virtual machines however represent transient modules that lack permanent storage, such as allocated disk storage.

When assembling a cloud-based platform to process secure data, for example a credit card company migrating statement processing to the cloud, it may therefore be not practical or possible to migrate the secure data itself to the cloud. As one consideration, the lack of permanent storage in the cloud may make it impossible for the operator to transmit the secure data store to the cloud for storage. For another, even if storage were available or connected to the cloud, regulator requirements as noted may prohibit the disclosure, duplication or movement of secure data to an off-premise site. It may be desirable to provide methods and systems for management of secure data in cloud-based networks which permits the safe use of secure data from on-premise data stores.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Embodiments of the present teachings relate to systems and methods for the management of secure data in a cloud-based network. More particularly, embodiments relate to a platform for migrating or building a data processing facility to or in a cloud-based environment, while leaving a secure data store in place in an on-premise facility. The set of virtual machines can operate to access and update secure data in the secure data store, while maintaining appropriate safeguards for the data while being accessed, manipulated and stored. In embodiments, the set of instantiated virtual machines in a cloud can transmit requests for secure data to be extracted from an on-premise secure data store, applying one or more protection mechanisms to communicate that data.

The secure data identified in the request can be translated via a translation module, to extract the secure data using the operative protection mechanism. For instance, the translation module can locate the data within a translation table or other redirection mechanism, and mask that data for transmission to the requesting virtual machine. The masked secure data can, in embodiments, also or instead be encrypted via one or more layers of encryption for transmission via the Internet or other network to the virtual machine. The requesting virtual machine can receive and decode the masked secure data, process that data and act on that data, as appropriate. For example, the requesting virtual machine can receive a credit card number or account number via those protection mechanisms, and process a pending transaction based on that information. Other protection mechanisms can be used.

Upon completion of the necessary data processing activity, the requesting virtual machine can delete the decoded secure data, or in instances can transmit the secure data or an updated version of the secure data back to the secure data store using the same protection mechanisms. The set of instantiated virtual machines can therefore gain access to secure data stored in an on-premise secure data store from the cloud, while the integrity of that data is securely maintained. These and other embodiments described herein address the various noted shortcomings in known cloud computing technology, and provide a user or network operator with an enhanced ability to make secure data available to sets of instantiated virtual machines.

Reference will now be made in detail to exemplary embodiments of the present teachings, which are illustrated in the accompanying drawings. Where possible the same reference numbers will be used throughout the drawings to refer to the same or like parts.

Figure 1:
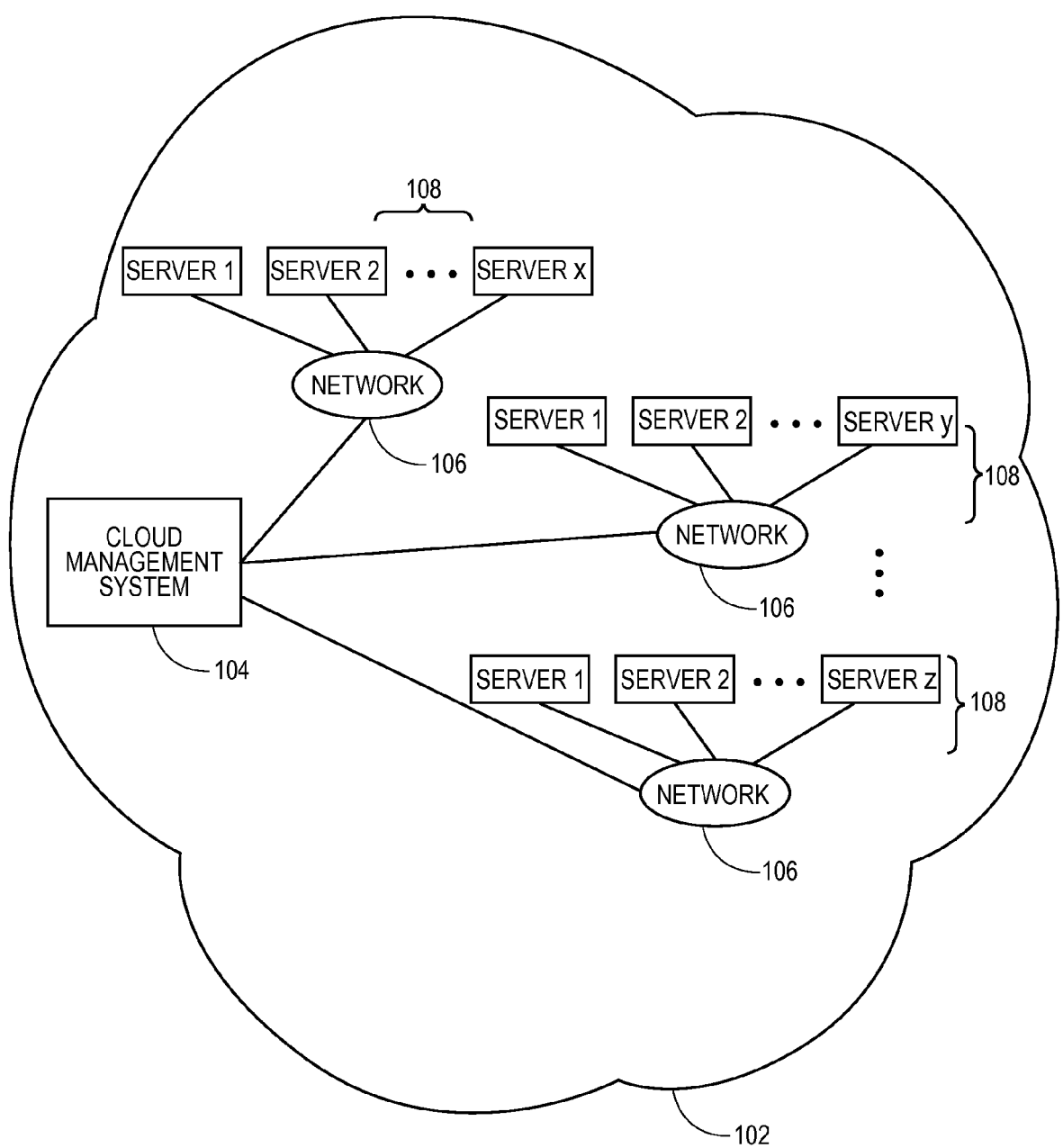
FIG. 1 illustrates an overall cloud system architecture in which various embodiments of the present teachings can be practiced.

Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
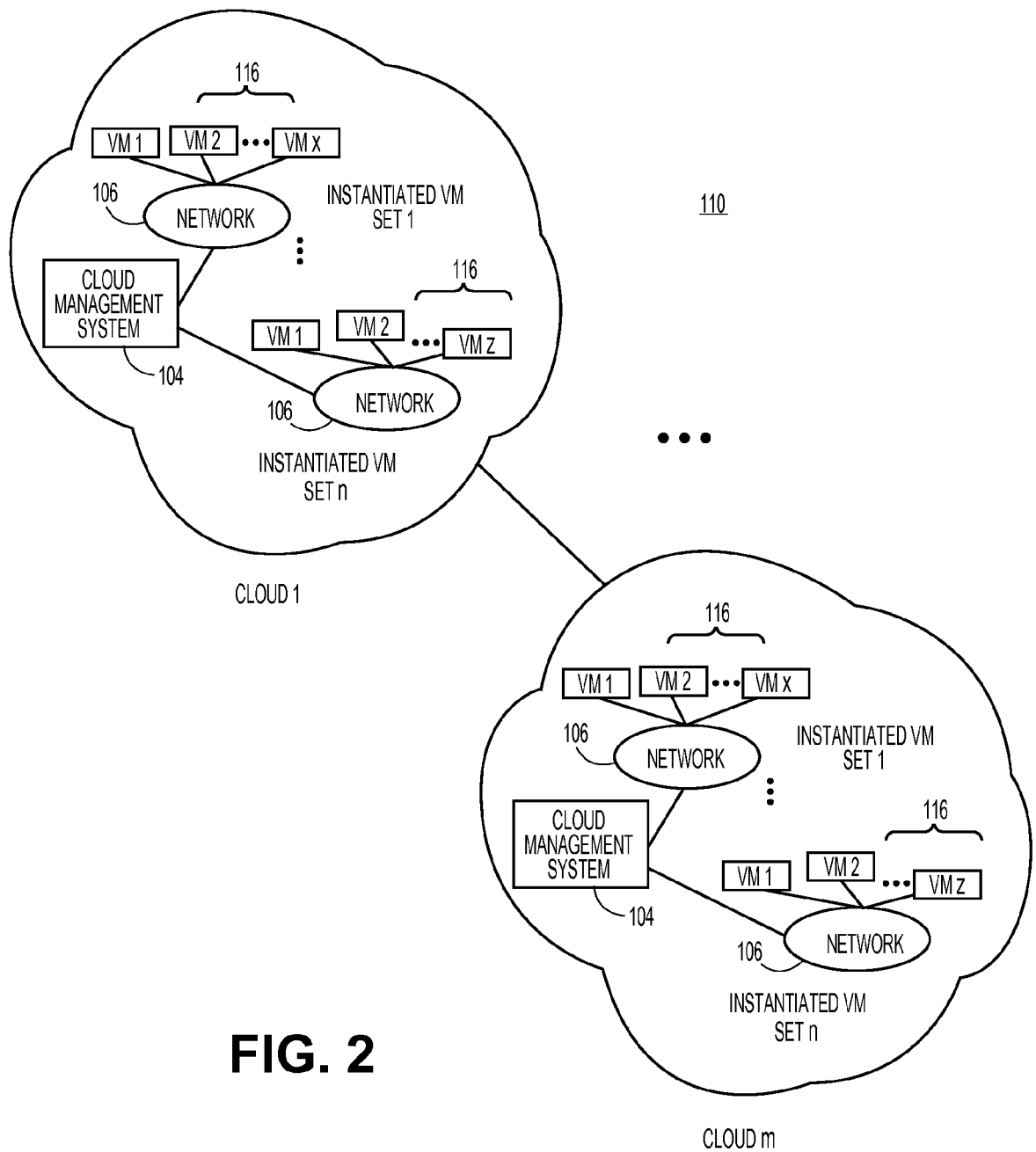
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on one or more networks 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud can 102, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated clients 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the main cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
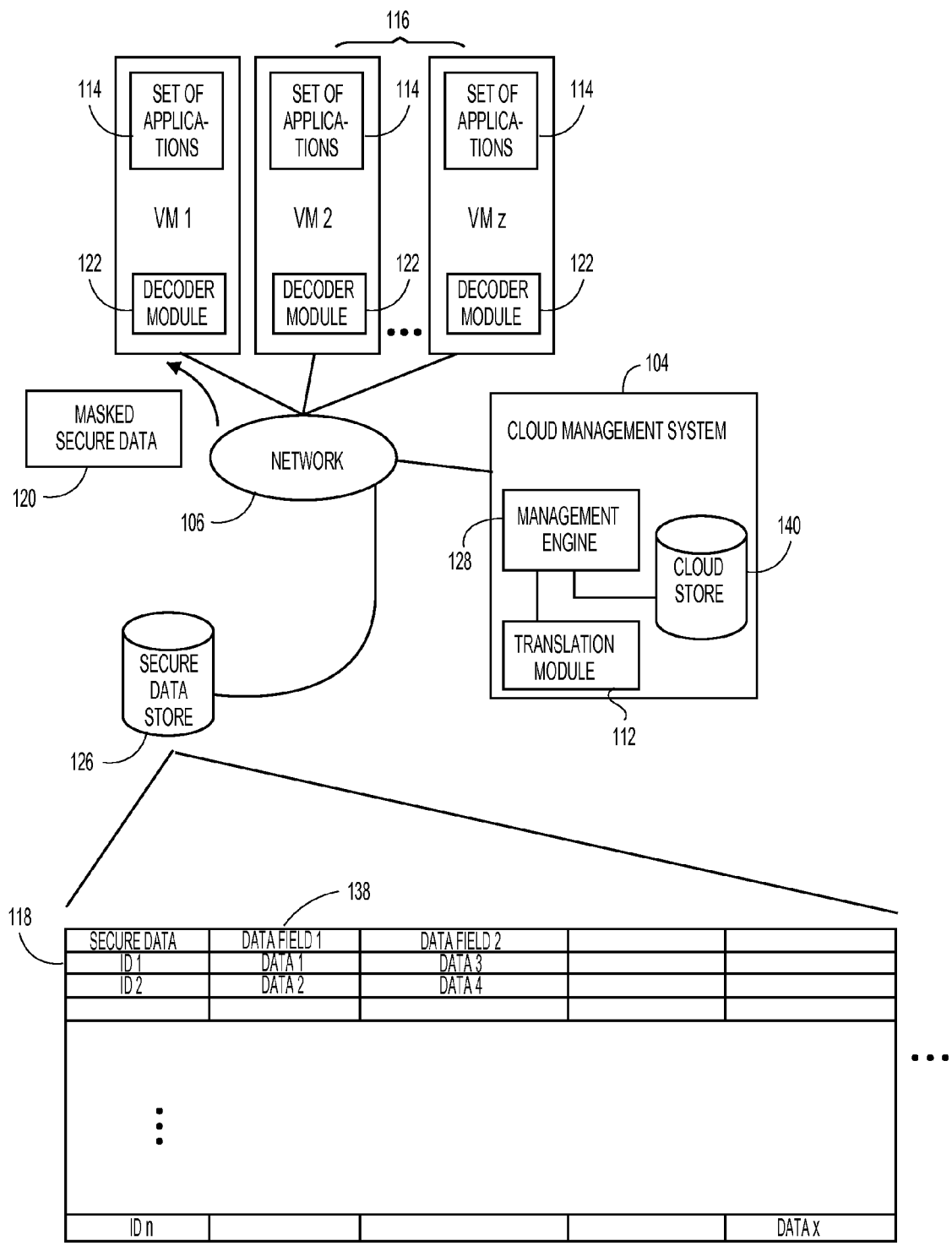
FIG. 3 illustrates a network configuration in which a cloud management system can perform various secure data management functions, according to various embodiments.

FIG. 3 illustrates a configuration of a cloud management system and associated resources configured to manage secure data, according to embodiments of the present teachings. Cloud management system 104 communicates with secure data store 126 via one or more networks 106. The one or more networks 106 can include the public Internet, and/or other public or private networks. The secure data store 126 can be an on-premise data store of an operator or other entity that stores secure data 118. Secure data 118 can include, merely for instance, financial, medical, technical, or other information, such as account or social security numbers, address information, medical history information, or other data. The secure data store 126 for instance can comprise a data store or data warehouse maintained by financial institutions such as banks, mortgage companies, credit card companies, or other entities. In embodiments, secure data 118 may require certain regulatory or operational safeguards due to the nature of the information reflected therein, so that secure data 118 may not be permitted to be transmitted outside secure data store 126 in the clear, or committed to permanent storage in any location other than secure data store 126. As noted, regulatory compliance may be mandated by laws or regulations such as HIPPA, the Sarbanes-Oxley Act, or other guidelines.

Any one of the machines in the set of instantiated virtual machines 116 can make a request for the secure data 118 hosted in secure data store 126. Virtual machines in the set of instantiated virtual machines 116 can be loaded or provisioned with a set of applications 114 configured to operate on secure data 118 to carry out various processing functions. For example, the set of applications 114 can contain one or more transaction processing applications or logic to permit the set of instantiated virtual machines 116 to execute online transactions at a Web storefront or elsewhere using secure data 118 such as credit card numbers or account numbers. In embodiments, the set of instantiated virtual machines 116 can represent a migrated set of virtual processing resources to which an operator's data processing facilities have been moved. In embodiments, the set of instantiated virtual machines 116 can represent an original build of a data processing infrastructure configured to operate on secure data 118.

A virtual machine in the set of instantiated virtual machines 116 can transmit a data request to cloud management system 104 to access secure data 118 contained in secure data store 126. The request can contain a reference to secure data 118 by an indirect address or identifier contained in secure data store 126. The cloud management system 104 can respond by invoking translation module 112 to translate the request for the secure data 118 to locate a corresponding entry in secure data store 126, such as a table entry. Translation module 112 can locate secure data 118 by reference to the location of that data in secure data store 126, and access that data along with any associated secure data fields 138, such as metadata defining the most recent date modified, file type, required permission levels, or other information related to secure data 118. In embodiments, secure data store 126 can be hosted in the same physical premises or facility as cloud management system 104. In embodiments, secure data store 126 can be hosted in a separate facility or premise from cloud management system 104.

Translation module 112 can then extract secure data 118, and prepare it for transmission to the requesting virtual machine (or machines) by masking secure data 118 to generate masked secure data 120. The masking of secure data 118 can comprise performing a masking operation on secure data 118, to alter the original information so that it will not travel in the clear. Various masking functions can be used. The masking operation can include, merely for example, masking a 16-digit account number or other data against a string or mask of the same length, for instance 16 random 1 or 0 or other digits to alter the original number or other identifier. The result of the masking operation is masked secure data 120 in the form of an altered string of digits. The masking operation can comprise passing or blocking individual digits aligned with 0 or 1 values respectively, adding digits to corresponding digits, or performing other operations. Blocked or concealed digits can be extracted using the mask string and related information, such as encoded values of masked digits. In embodiments, once masking is performed, masked secure data 120 can additionally be encrypted, for example using public or private key encryption techniques. The masked secure data 120 is transmitted by translation module 112 of cloud management system 104 to the requesting virtual machine via one or more networks 106. In embodiments, other masking techniques can be used.

The virtual machine within the set of instantiated virtual machines 116 that receives the masked secure data 120 can decode that data via a decoder module 122 configured to de-mask, decrypt, or otherwise decode masked secure data 120 to generate decoded secure data 120. Decoder module 122 can receive masking strings or other data used to generate masked secure data 120 from cloud management system 104, to perform decoding or unmasking operations. One or more applications in set of applications 114 installed on the requesting virtual machine can then receive and operate on decoded secure data 120, for example to process an account number or credit card number to execute a purchase or other transaction. In embodiments, the application in set of applications 114 that operates on decoded secure data 120 can store any updates to that data back to secure data store 126 via cloud management system 104. In various embodiments, an application in set of applications 114 that captures an initial set of secure data, for example from a user in an online transaction, can likewise transmit that original secure data to secure data store 126 to enter that data into the store. The return transmission of any new or updated information to secure data store 126 can be via decoder module 122 or other logic that performs the same types of translation, masking, encryption or other processing on decoded secure data 120 as translation module 112.

In embodiments, during all phases of transit, therefore, secure data 118 is maintained in a masked, encrypted, or otherwise protected state. In embodiments, secure data 118 is likewise never transmitted in the clear, and may only be indirectly referenced by translation to a table location or other address in secure data store 126. In embodiments, secure data 118 is likewise never stored in permanent storage in cloud 102 or other locations, other than secure data store 126. Desired processing functions can nevertheless be carried out in the set of instantiated virtual machines 116 using that protected data.

Figure 4:
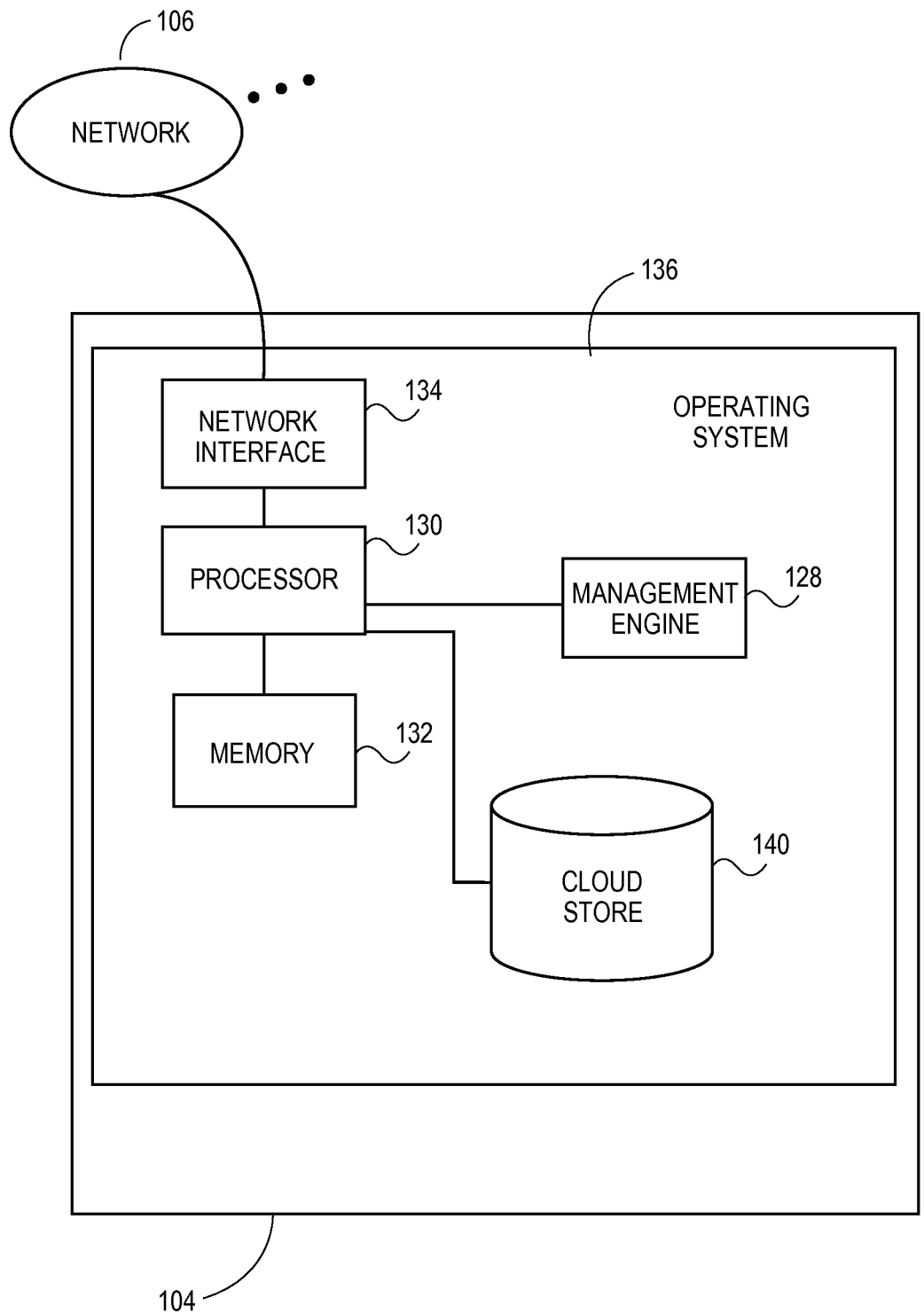
FIG. 4 illustrates an exemplary hardware configuration for a cloud management system, according to various embodiments.

FIG. 4 illustrates an exemplary diagram of hardware and other resources that can be incorporated in a cloud management system 104 configured to communicate with set of instantiated virtual machines 116 via one or more networks 106, according to embodiments. In embodiments as shown, cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with cloud management store 140, such as a database stored on a local hard drive. Processor 130 further communicates with network interface 134, such as an Ethernet or wireless data connection, which in turn communicates with one or more networks 106, such as the Internet or other public or private networks. Processor 130 also communicates with could management store 140 and management engine 128, to execute control logic and control the operation of virtual machines and other resources in cloud 102. Other configurations of cloud management system 104, associated network connections, and other hardware and software resources are possible.

Figure 5:
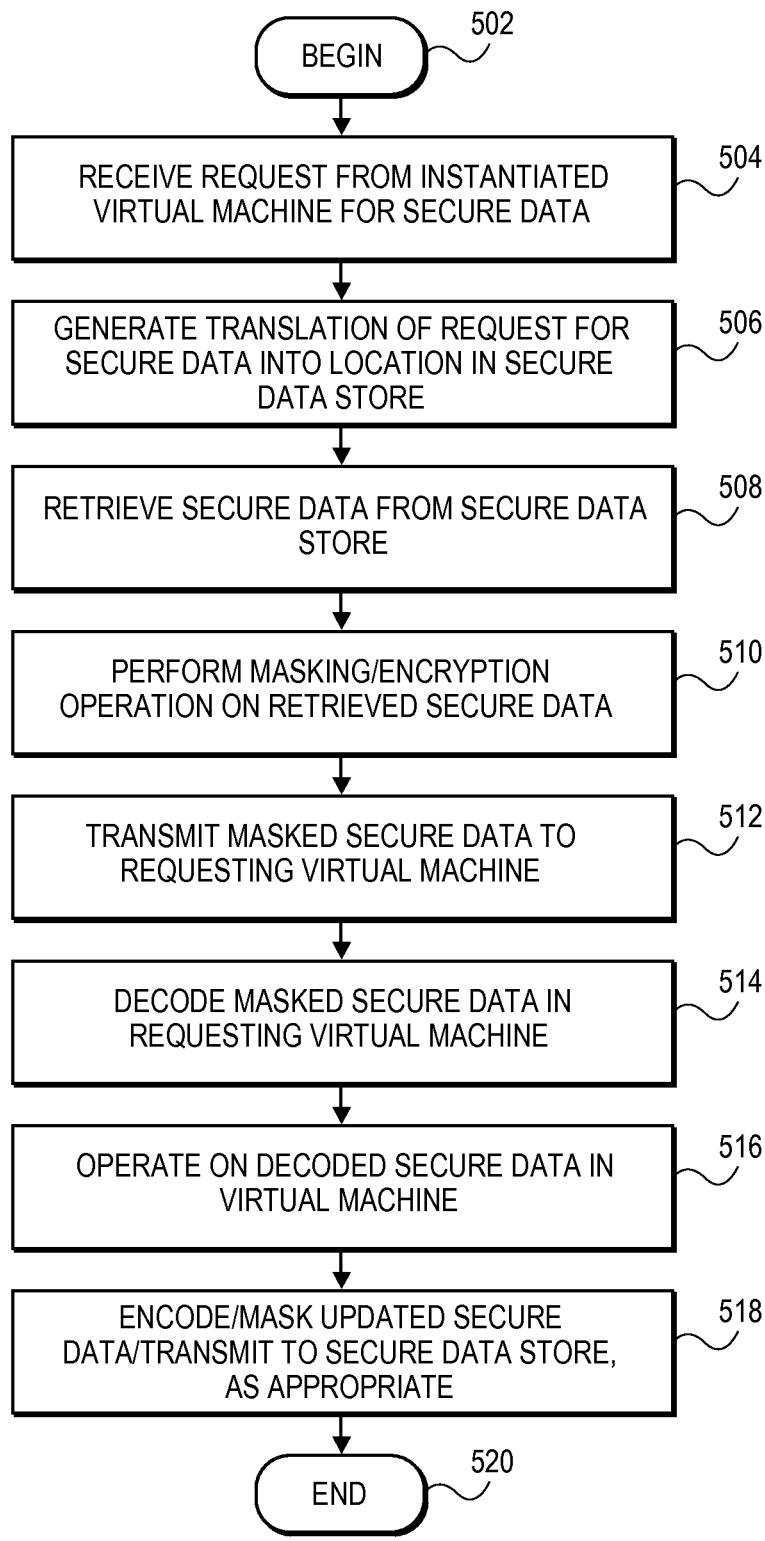
FIG. 5 illustrates a flowchart for overall secure data processing in a cloud computing environment, according to various embodiments.

FIG. 5 illustrates a flow diagram of overall processing for secure data management in a cloud-based network, according to embodiments. In step 502, processing can begin. In step 504, a request for secure data can be received by cloud management system 104 from one or more virtual machines in a set of instantiated virtual machines 116. The request for secure data can specify the data by, for example, a file name, file type, user name, or other identifier. In step 506, the translation module 112 of cloud management system 104 can generate a translation of the request for secure data into an address or location in secure data store 126. For instance, the translation module 112 can use a lookup table to determine a table location or other address, identifier or location for the desired secure data. In step 508, the translation module 112 or other logic in cloud management system 104 can retrieve the desired secure data from secure data store 126.

In step 510, the translation module 112 or other logic in cloud management system 104 can perform a masking and/or encryption operation on the retrieved secure data. For instance, public or private key encryption can be performed on the retrieved secure data. In step 512, the cloud management system 104 can transmit the resulting masked secure data 120 to the requesting virtual machine. In step 514, a decoder module 122 in the requesting virtual machine can receive and decode the masked secure data 120 to generate decoded secure data 124. In step 516, the requesting virtual machine can operate on the decoded secure data 124 using set of applications 114, or other software or modules. For example, the requesting virtual machine can operate on account information as the decoded secure data 124 to execute a purchase or other transaction.

In step 518, the requesting virtual machine in embodiments can mask, encrypt, or encode any resulting updated secure data, and transmit that data to secure data store 126. In step 520, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which digit masking is employed as a protection mechanism, in embodiments, other or additional protection mechanisms can be used. For further example, while embodiments have been described in which virtual machines access a single secure data store 126, in embodiments the secure data available to the set of virtual machines can be stored in multiple data stores. For yet further example, while embodiments have been described in which a single set of instantiated virtual machines accesses the secure data store, in embodiments multiple or non-overlapping sets of virtual machines can be configured to access secure data store 126. In implementations in which multiple sets of virtual machines access secure data store 126, those various sets can be located in one or more clouds. Other resources described as singular or integrated can in embodiments be plural or distributed, and resources described as multiple or distributed can in embodiments be combined. The scope of the present teachings is accordingly intended to be limited only by the following claims.

What is claimed is:

1. A method, comprising:
receiving a request to access secure data in a secure data store;
translating, using a processor, data identified in the request in order to locate the secure data in the secure data store, wherein the translating comprises translating an address associated with the identified data to a location of an entry in the secure data store;
retrieving the secure data from the secure data store;
encoding the secure data to generate protected secure data;
transmitting the protected secure data from the secure data store to an instantiated virtual machine;
decoding the protected secure data in the instantiated virtual machine to generate decoded secure data;
operating on the decoded secure data in the instantiated virtual machine; and
transmitting updated secure data from the instantiated virtual machine to the secure data store.

2. The method of claim 1, wherein the secure data store comprises an on-premise data store.

3. The method of claim 1, wherein the translating comprises translating an address into a secure data table.

4. The method of claim 1, wherein the secure data store is co-located with a cloud management system.

5. The method of claim 1, wherein the secure data store is located external to a cloud management system.

6. The method of claim 1, wherein the encoding of the secure data comprises at least one of masking the secure data and encrypting the secure data.

7. The method of claim 1, wherein at least one instantiated virtual machine comprises a migrated image of an on-premise machine.

8. The method of claim 1, wherein the secure data comprises at least one of user identification data, account data, medical data, technical data, and financial data.

9. A computer system, comprising:
a memory; and
a processor, coupled to the memory, the processor to:
receive a request to access secure data in a secure data store;
translate data identified in the request in order to locate the secure data in the secure data store, wherein the translating comprises translating an address associated with the identified data to a location of an entry in the secure data store;
retrieve the secure data from the secure data store;
encode the secure data to generate protected secure data transmit the protected secure data from the secure data store to an instantiated virtual machine;

decode the protected secure data in the instantiated virtual machine to generate decoded secure data;

operate on the decoded secure data in the instantiated virtual machine; and transmit updated secure data from the instantiated virtual machine to the secure data store.

10. The system of claim 9, wherein the secure data store comprises an on-premise data store.

11. The system of claim 9, wherein the translating comprises translating an address into a secure data table.

12. The system of claim 9, wherein the management module resides in a cloud management system.

13. The system of claim 9, wherein the management module is further to encode the secure data by at least one of masking the secure data and encrypting the secure data.

14. The system of claim 9, wherein at least one instantiated virtual machine comprises a migrated image of an on-premise machine.

15. The system of claim 9, wherein the secure data comprises at least one of user identification data, account data, medical data, technical data, and financial data.

16. A non-transitory computer-readable storage medium programmed to include instructions that, when executed by a processor, cause the processor to perform operations, comprising:

receiving a request to access secure data in a secure data store;

translating, using the processor, data identified in the request in order to locate the secure data in the secure data store, wherein the translating comprises translating an address associated with the identified data to a location of an entry in the secure data store;

retrieving the secure data from the secure data store;

encoding the secure data to generate protected secure data;

transmitting the protected secure data from the secure data store to an instantiated virtual machine;

decoding the protected secure data in the instantiated virtual machine to generate decoded secure data;

operating on the decoded secure data in the instantiated virtual machine; and transmitting updated secure data from the instantiated virtual machine to the secure data store.

17. The non-transitory computer-readable storage medium of claim 16, wherein the secure data store comprises an on-premise data store.

18. The non-transitory computer-readable storage medium of claim 16, wherein the translating comprises translating an address into a secure data table.

* * * * *